United States Patent
Hong et al.

(10) Patent No.: US 8,457,789 B2
(45) Date of Patent: Jun. 4, 2013

(54) WALL-FOLLOWING ROBOT CLEANER AND METHOD TO CONTROL THE SAME

(75) Inventors: Jun Pyo Hong, Suwon-si (KR); Woo Ram Chung, Anyang-si (KR); Kyung Hwan Yoo, Suwon-si (KR); Jae Man Joo, Suwon-si (KR); Hoon Wee, Yongin-si (KR); Dong Won Kim, Suwon-si (KR); Yong Tae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 577 days.

(21) Appl. No.: 12/007,898

(22) Filed: Jan. 16, 2008

(65) Prior Publication Data

US 2008/0249661 A1    Oct. 9, 2008

(30) Foreign Application Priority Data

Apr. 6, 2007    (KR) .................. 10-2007-0034403

(51) Int. Cl.
*G06F 17/00* (2006.01)
*A47L 11/40* (2006.01)

(52) U.S. Cl.
USPC ............ 700/252; 700/253; 700/245; 701/23; 701/25; 901/1; 15/3

(58) Field of Classification Search
USPC ......... 701/25, 23; 700/253, 252, 245; 15/319, 15/3, 340.1; 901/1
See application file for complete search history.

(56) References Cited

U.S. PATENT DOCUMENTS

| | | | |
|---|---|---|---|
| 6,496,754 B2 * | 12/2002 | Song et al. | 700/245 |
| 6,732,826 B2 * | 5/2004 | Song et al. | 180/169 |
| 6,809,490 B2 * | 10/2004 | Jones et al. | 318/568.12 |
| 6,830,120 B1 * | 12/2004 | Yashima et al. | 180/167 |
| 6,841,963 B2 * | 1/2005 | Song et al. | 318/568.12 |
| 7,430,455 B2 * | 9/2008 | Casey et al. | 700/245 |

(Continued)

FOREIGN PATENT DOCUMENTS

| | | |
|---|---|---|
| JP | 2005-211366 | 8/2005 |
| JP | 2005-230044 | 9/2005 |

(Continued)

OTHER PUBLICATIONS

Chinese Office Action for corresponding Chinese application 200810082618.1; issued Sep. 11, 2009.

(Continued)

*Primary Examiner* — Ronnie Mancho
(74) *Attorney, Agent, or Firm* — Staas & Halsey LLP

(57) ABSTRACT

A robot cleaner that cleans a cleaning region while traveling the cleaning region and a method to control the same are provided. The robot cleaner can uniformly clean a cleaning region based on a wall-following technique which allows the robot cleaner to travel along the outline of the cleaning region. The method selects, as a reference wall, a wall at a left or right side of the robot cleaner at a start position of the robot cleaner based on a left or right-based travel algorithm, which allows the robot cleaner to travel along a left or right wall, and controls the robot cleaner to travel the cleaning region in a zigzag travel pattern in which the robot cleaner moves a predetermined distance in a direction perpendicular to the reference wall at specific intervals along the selected reference wall while following the selected reference wall.

13 Claims, 12 Drawing Sheets

U.S. PATENT DOCUMENTS

2004/0083570 A1* 5/2004 Song et al. .................. 15/319
2005/0166355 A1* 8/2005 Tani .............................. 15/319
2005/0171644 A1* 8/2005 Tani ............................ 700/253

FOREIGN PATENT DOCUMENTS

| JP | 2006-302252 | 11/2006 |
|---|---|---|
| KR | 10-0549042 | 1/2005 |
| KR | 10-2005-0071239 | 7/2005 |

OTHER PUBLICATIONS

Korean Office Action mailed Feb. 27, 2012 issued in corresponding Korean Patent Application No. 10-2007-0034403.

* cited by examiner

WALL-FOLLOWING ROBOT CLEANER AND METHOD TO CONTROL THE SAME

CROSS-REFERENCE TO RELATED APPLICATIONS

This application claims the benefit of Korean Patent Application No. 2007-0034403, filed on Apr. 9, 2007 in the Korean Intellectual Property Office, the disclosure of which is incorporated herein by reference.

BACKGROUND

1. Field

The present invention relates to a robot cleaner that cleans a cleaning region while automatically traveling in the cleaning region, and more particularly, to a robot cleaner, which can uniformly clean a cleaning region based on a wall-following technique which allows it to travel along the outline of the cleaning region, and a method to control the same.

2. Description of the Related Art

The robot cleaner is a device that performs a cleaning operation to suck dust or foreign substance from the floor of a region to be cleaned (cleaning region) while automatically traveling in the cleaning region without control from the user. The robot cleaner determines the distance to an obstacle, such as furniture, an office supply item, and a wall, provided in the cleaning region using a sensor and cleans the cleaning region while traveling in the cleaning region without colliding with the obstacle using the determination information.

To clean a given cleaning region, the robot cleaner repeats a cleaning operation while moving in a preset cleaning (travel) pattern in the cleaning region. Typical examples of the preset cleaning pattern include a zigzag travel pattern, a spiral travel pattern, and a random travel pattern. A procedure in which the robot cleaner performs a cleaning operation when the preset cleaning pattern is a combination of the spiral travel pattern and the random travel pattern will now be described with reference to FIG. 1.

As shown in FIG. 1, when a robot cleaner is powered on, the robot cleaner starts cleaning a given cleaning region in a preset cleaning pattern (1). Specifically, the robot cleaner cleans the cleaning region while traveling along a preset spiral line. The robot cleaner performs a random travel by moving in arbitrary directions after completing the spiral travel. The robot cleaner rotates by an arbitrary angle upon encountering an obstacle during the random travel. The robot cleaner then increases a cleaning pattern execution count by one (3). The robot cleaner compares the cleaning pattern execution count with a preset count (5). If the cleaning pattern execution count is equal to or greater than the preset count, the robot cleaner recognizes completion of the cleaning of the given cleaning region (7). If the cleaning pattern execution count is less than the preset count, the robot cleaner repeats the cleaning operation in the preset cleaning pattern.

If the robot cleaner recognizes completion of the cleaning of the given cleaning region, the robot cleaner moves to a next cleaning region (9) and then performs a cleaning operation of the next cleaning region.

Since regions to be cleaned by the robot cleaner generally include rooms of various sizes, a cleaning pattern execution count required to complete cleaning of a room must be changed according to the size of the room. However, robot cleaner products are shipped after a cleaning pattern execution count required to complete cleaning is preset by default. Therefore, the robot cleaner may not clean some areas in a room if a preset cleaning pattern count less than that suitable for the size of the room was input as a count required to complete cleaning. On the contrary, if a preset count greater than that required for the size of the room was input, overlapping of cleaned areas increases, although the probability that that part of the room will not be cleaned is reduced. This reduces the efficiency of use of the robot cleaner that operates with batteries.

SUMMARY

Therefore, it is an aspect of the embodiment to provide a robot cleaner and a method to control the same, where the robot cleaner can more efficiently clean an entire region to be cleaned (an entire cleaning region) without skipping any part of the cleaning region using a wall-following algorithm which allows the robot cleaner to travel along the outline of the cleaning region.

It is another aspect of the embodiment to provide a robot cleaner and a method to control the same where a left or right-based travel algorithm which allows the robot cleaner to travel along a left or right wall is applied so that the robot cleaner can uniformly clean the entire cleaning region while moving in a zigzag travel pattern in which a wall at the left or right side of the robot cleaner at a start position is used as a reference wall.

It is another aspect of the embodiment to provide a robot cleaner and a method to control the same wherein two or more reference walls of the cleaning region are selected such that the corresponding zigzag travel patterns of the robot cleaner are perpendicular to each other to form a matrix of paths, thereby allowing the robot cleaner to travel the entire cleaning region without skipping any part of the cleaning region.

Additional aspects and/or advantages will be set forth in part in the description which follows and, in part, will be obvious from the description, or may be learned by practice of the invention.

The foregoing and/or other aspects of the present embodiment may be achieved by providing a method to control a robot cleaner that cleans a given cleaning region while traveling the given cleaning region, the method including selecting a first reference wall at a start position of the robot cleaner; and controlling the robot cleaner to move a first predetermined distance in a direction perpendicular to the first selected reference wall at specific intervals along the first selected reference wall to travel the cleaning region.

Selecting the reference wall may include selecting a wall at a left or right side of the robot cleaner at the start position based on a left or right-based travel algorithm that allows the robot cleaner to travel along the wall at the left or right side of the robot cleaner.

Controlling the robot cleaner to travel the cleaning region may include controlling the robot cleaner to move in a zigzag travel pattern to gradually cover the cleaning region, the zigzag travel pattern being a pattern in which the robot cleaner moves a second predetermined distance in a direction perpendicular to the first selected reference wall at specific intervals along the first selected reference wall while following the first selected reference wall.

The zigzag travel pattern may include a first travel pattern in which the robot cleaner performs a wall-following movement of a specific interval along the first selected reference wall and then moves straight the second predetermined distance from the first selected reference wall and a second travel pattern in which the robot cleaner moves straight the second predetermined distance to a position to return to the first selected reference wall.

The method may further include determining whether the robot cleaner has completed cleaning of the cleaning region, the robot cleaner moving in the zigzag travel pattern to gradually cover the cleaning region while following the first selected reference wall, wherein, a second reference wall is selected at a position at which the robot cleaner has completed the cleaning in order to clean a next cleaning region when the robot cleaner has completed the cleaning of the cleaning region.

A number of the selected reference walls may be at least two.

Controlling the robot cleaner to travel the cleaning region may include controlling the robot cleaner to move in a zigzag travel pattern to gradually cover the cleaning region, the zigzag travel pattern being a pattern in which the robot cleaner moves the second predetermined distance in a direction perpendicular to the second selected reference wall at specific intervals along the second selected reference wall while following the second selected reference wall.

Controlling the robot cleaner to travel the cleaning region may include controlling the robot cleaner to move along paths in a matrix including at least two zigzag travel patterns in directions perpendicular to each other to allow the robot cleaner to travel throughout the cleaning region.

The foregoing and/or other aspects of the present invention may also be achieved by providing a robot cleaner to travel a given cleaning region to clean the cleaning region, the robot cleaner including a movable robot body; and a controller selecting a first reference wall at a start position of the robot cleaner and driving the movable robot body of the robot cleaner to move a first predetermined distance in a direction to the reference wall at specific intervals along the first selected reference wall to travel the cleaning region.

The controller may select a wall at a left or right side of the robot cleaner at the start position based on a left or right-based travel algorithm that allows the robot cleaner to travel along a wall at the left or right side of the robot cleaner.

The controller may control the robot cleaner to move in a zigzag travel pattern to gradually cover the cleaning region, the zigzag travel pattern being a pattern in which the robot cleaner moves a second predetermined distance in a direction perpendicular to the first selected reference wall at specific intervals along the first selected reference wall while following the first selected reference wall.

The controller may determine whether the robot cleaner has completed cleaning of the cleaning region, the robot cleaner moving in the zigzag travel pattern to gradually cover the cleaning region while following the first selected reference wall, and select a second reference wall at a position at which the robot cleaner has completed the cleaning when the controller determines that the robot cleaner has completed the cleaning of the cleaning region.

The controller may select at least two reference walls.

The controller may control the robot cleaner to move in a zigzag travel pattern to gradually cover the cleaning region, the zigzag travel pattern being a pattern in which the robot cleaner moves the second predetermined distance in a direction perpendicular to the second selected reference wall at specific intervals along the second selected reference wall while following the second selected reference wall.

The controller may control the robot cleaner to move along paths in a matrix including at least two zigzag travel patterns in directions perpendicular to each other to allow the robot cleaner to travel throughout the cleaning region.

The foregoing and/or other aspects of the present invention may also be achieved by providing a method of controlling a robot cleaner, including: selecting a first reference wall of a room in relation to the robot cleaner; and controlling the robot cleaner to move a first distance, rotate 90 degrees and move a second distance in repetition in relation to the first selected reference wall to travel a cleaning region.

The method may further include determining whether an angle of the first selected reference wall has changed by more than a specific angle with reference to a contour of the room, wherein the robot cleaner is controlled to move the first distance, rotate 90 degrees and move the second distance in repetition when it is determined that the angle of the first selected reference wall has not changed by more than the specific angle with reference to the contour of the room.

The method may further include selecting a second reference wall of the room in relation to the robot cleaner; and controlling the robot cleaner to move the first distance, rotate 90 degrees and move the second distance in repetition in relation to the second selected reference wall to travel the cleaning region when it is determined that the angle of the first selected reference wall has changed by more than the specific angle with reference to the contour of the room.

The method may further include selecting a second reference wall of the room in relation to the robot cleaner; and controlling the robot cleaner to move a third distance, rotate 90 degrees and move a fourth distance in repetition in relation to the second selected reference wall to travel the cleaning region when it is determined that the angle of the first selected reference wall has changed by more than the specific angle with reference to the contour of the room.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENT

Figure 1:
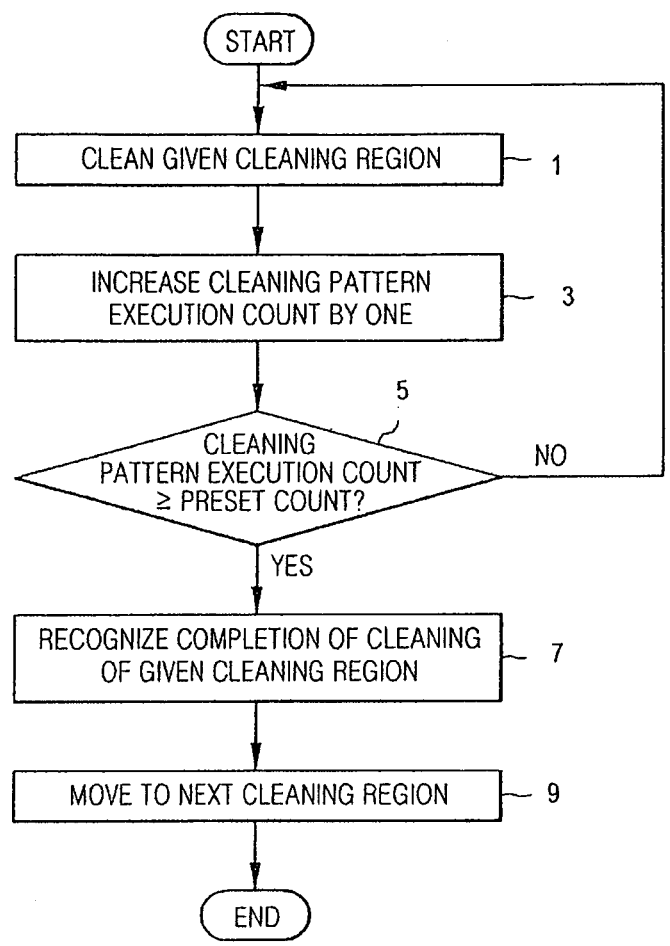
FIG. 1 is a flow chart showing how a conventional robot cleaner operates to determine completion of travel of a cleaning region.

Reference will now be made in detail to the embodiment, examples of which are illustrated in the accompanying drawings, wherein like reference numerals refer to the like elements throughout. The embodiment is described below to explain the present invention by referring to the figures.

A robot cleaner to which the present embodiment is applied is a general automatic robot to clean which has wheels to allow movement and a dust sucker to clean. A description of the structure of the robot cleaner is omitted since the present embodiment can be applied to any type of robot cleaner.

Figure 2:
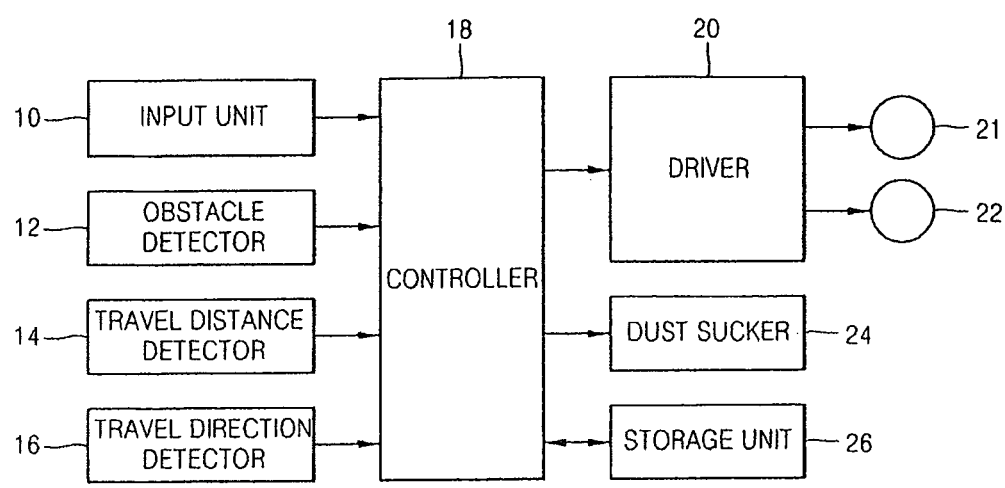
FIG. 2 is a control block diagram of a robot cleaner according to an embodiment.

FIG. 2 is a control block diagram of a robot cleaner according to an embodiment, which includes an input unit 10, an obstacle detector 12, a travel distance detector 14, a travel direction detector 16, a controller 18, a driver 20, a dust sucker 24, and a storage unit 26.

The input unit 10 includes a key operating unit or a remote controller to allow the user to input a cleaning instruction into the robot cleaner.

The obstacle detector 12 detects obstacles, such as furniture, office supplies, and walls, provided in a cleaning region in which the robot cleaner travels. The obstacle detector 12 detects a presence or absence of an obstacle or measures the distance to an obstacle by emitting an ultrasound signal to a path along which the robot cleaner will travel and by receiving the ultrasound signal reflected from the obstacle. The obstacle detector 12 may use an infrared sensor that includes a plurality of infrared light emitting devices and a plurality of light receiving devices to emit infrared light and to receive reflected light.

The travel distance detector 14 detects a distance that the robot cleaner has traveled. Specifically, the travel distance detector 14 measures the amount of rotation of each wheel, which is provided under the robot cleaner to move the robot cleaner, through an encoder or the like attached to the wheel to detect a travel distance of the robot cleaner.

The travel direction detector 16 detects an angle of rotation of the robot cleaner. Specifically, when the robot cleaner has detected an obstacle in a path to travel, the robot cleaner uses a rotation angle sensor, such as a gyro-sensor or encoders attached to both wheels, to detect the angle of rotation of the robot cleaner from the direction of the robot cleaner to the obstacle.

The controller 18 controls an overall operation of the robot cleaner. The controller 18 uses a Reference Wall based Matrix (RWM) algorithm to clean a cleaning region based on a wall-following technique that allows the robot cleaner to move along walls, which are the outer edges of the cleaning region, so that the robot cleaner can uniformly clean the entire cleaning region while automatically moving. To accomplish this, the controller 18 uses a left or right-based travel algorithm, which allows the robot cleaner to travel along a left or right wall, as the wall-following technique. That is, the controller 18 selects a wall at the left or right side of the robot cleaner at a start position of the robot cleaner as a reference wall and controls the robot cleaner to move a predetermined distance L at specific intervals d along the reference wall in a zigzag travel pattern to gradually cover the cleaning region. Then, the controller 18 selects a new reference wall in the same cleaning region and controls the robot cleaner to move a predetermined distance L at specific intervals d along the new selected reference wall in a zigzag travel pattern to gradually cover the cleaning region in the same manner as described above. The two zigzag travel patterns are perpendicular to each other to form a matrix of paths so that the robot cleaner can travel the entire cleaning region without skipping any part of the cleaning region.

The driver 20 drives left and right wheels 21 and 22 that are provided under the body of the robot cleaner to allow the robot cleaner to perform its direction change, such as rotation, while automatically traveling under control of the controller 18.

The dust sucker 24 performs a cleaning operation to suck dust or foreign substance from the floor on which the robot cleaner travels according to control of the controller 18.

The storage unit 26 registers and stores obstacle information and corner information extracted by the controller 18.

Reference will now be made to operations and advantages of a robot cleaner constructed as described above and a method to control the same.

Figure 3A:
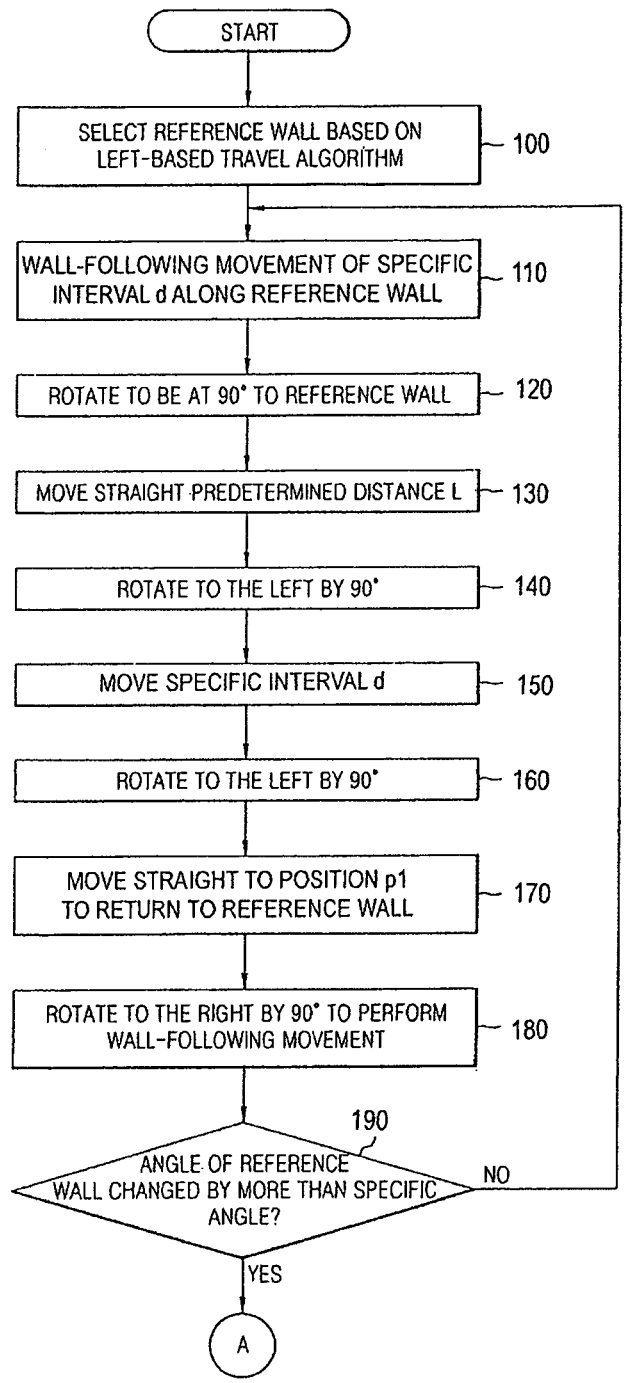
FIGS. 3A and 3B are flow charts showing how a robot cleaner according to the present embodiment operates to travel a cleaning region.
Figure 3B:
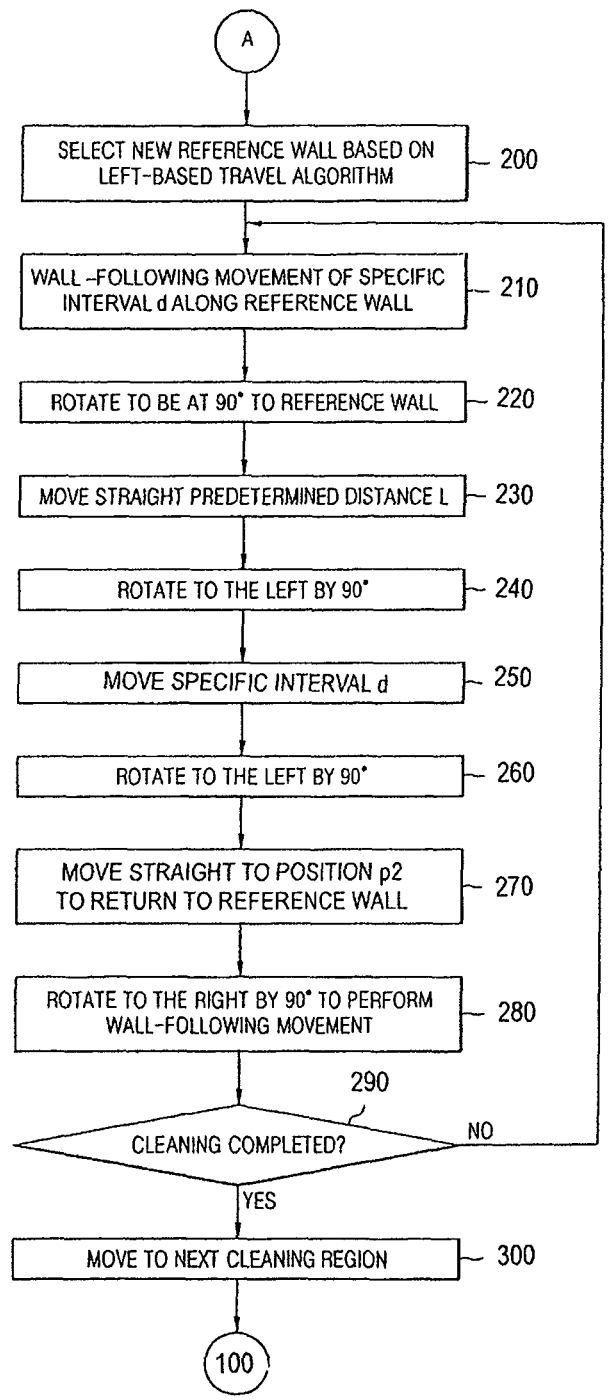

FIGS. 3A and 3B are flow charts of a procedure to control the operation of a robot cleaner to move in a cleaning region according to the present embodiment.

In FIGS. 3A and 3B, when the user powers on the robot cleaner and inputs a cleaning instruction into the robot cleaner through the input unit 10, the controller 18 starts a Reference Wall based Matrix (RWM) algorithm to clean the cleaning region based on a left-wall-following method in which the robot cleaner travels along a left wall which is an outer edge of the cleaning region.

Figure 4:
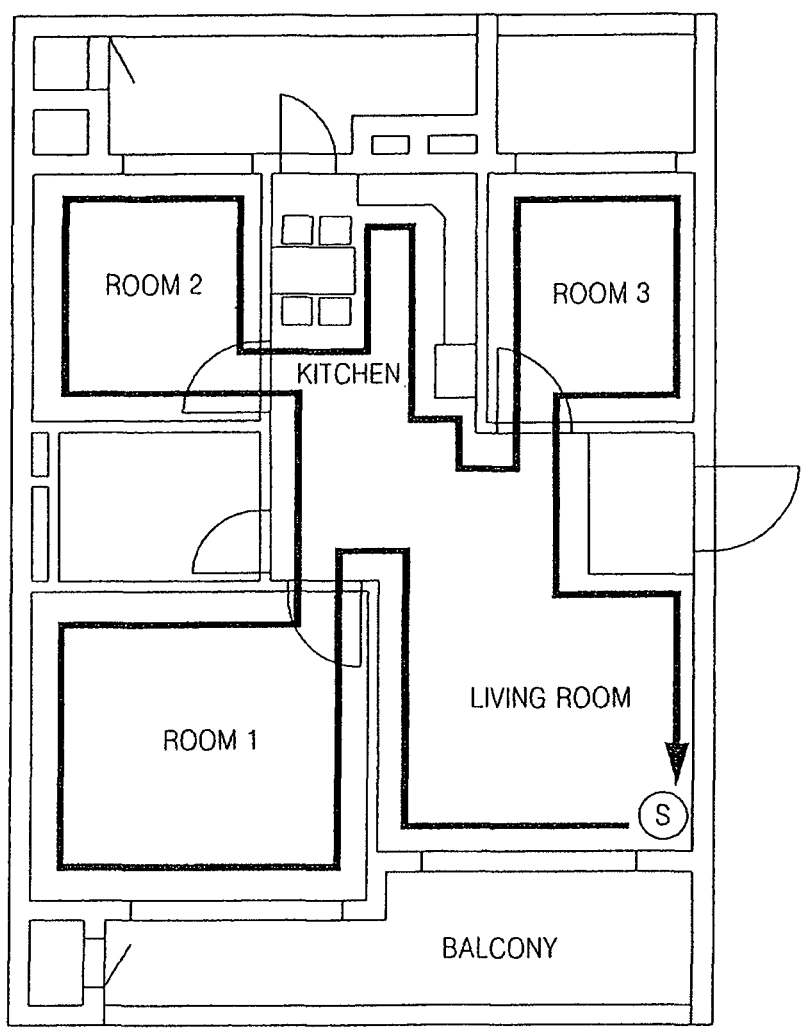
FIG. 4 shows a wall-following path of a robot cleaner according to the present embodiment when a left-based travel algorithm is applied.

FIG. 4 illustrates contour surrounding regions in which the robot cleaner can travel. By cleaning the interior of the contour, the robot cleaner can clean all the cleanable regions without skipping any part of the cleaning regions.

Specifically, FIG. 4 is a plan view of an 82.5 m² apartment showing a wall-following path of the robot cleaner when the robot cleaner travels in inner regions of the apartment according to a left-based travel algorithm, which is a wall-following technique which allows the robot cleaner to move along left walls. The robot cleaner can clean regions to be cleaned (cleaning regions) without skipping any part of the cleaning regions by traveling so as to cover all the inner regions surrounded by the contour.

Figure 5A:
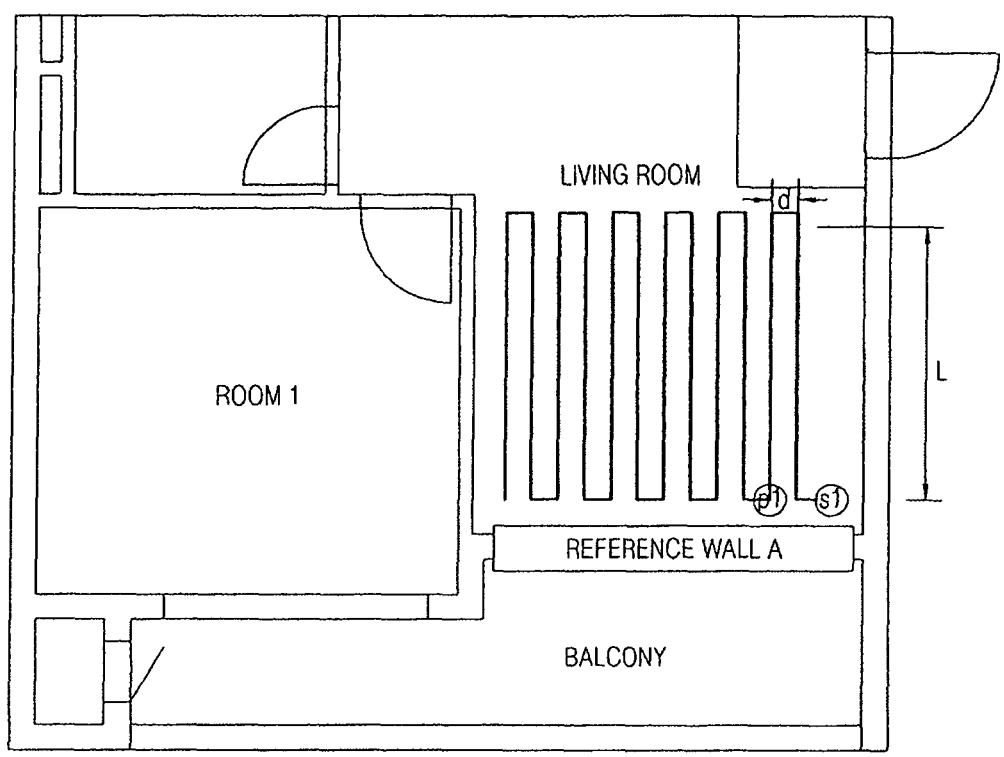
FIGS. 5A to 5D show travel paths of a robot cleaner according to the present embodiment.

First, as shown in FIG. 5A, the controller 18 selects a wall at the left side of the robot cleaner at a start position s1 of the robot cleaner as a reference wall A based on a left-based travel algorithm that is a wall-following technique (100).

When the reference wall A is selected, the robot cleaner performs a wall-following movement of a specific interval d along the reference wall A (110) and then rotates to the right (or left) to be at 90 degrees to the reference wall A (120) and then moves straight a predetermined distance L (130).

After moving straight the predetermined distance L, the robot cleaner rotates to the left by 90 degrees (140) and moves straight the predetermined distance d (150). The robot cleaner again rotates to the left by 90 degrees (160) and moves straight to a position p1 to return to the reference wall A (170).

After moving straight to the return position p1, the robot cleaner again rotates to the right by 90 degrees to perform a wall-following movement (180). In this manner, the robot cleaner moves in a zigzag travel pattern to gradually cover the cleaning region as shown in FIG. 5A. The controller 18 then determines whether or not the angle of the reference wall A has been changed by more than a specific angle with reference to the shape of the contour created in FIG. 4 according to the wall-following technique (190). If the angle of the reference wall A has been changed by the specific angle or less, the controller 18 determines that the robot cleaner has not traveled throughout the given cleaning region and returns to the above operation 110 to start a wall-following movement of the specific interval d along the reference wall A.

Figure 5B:
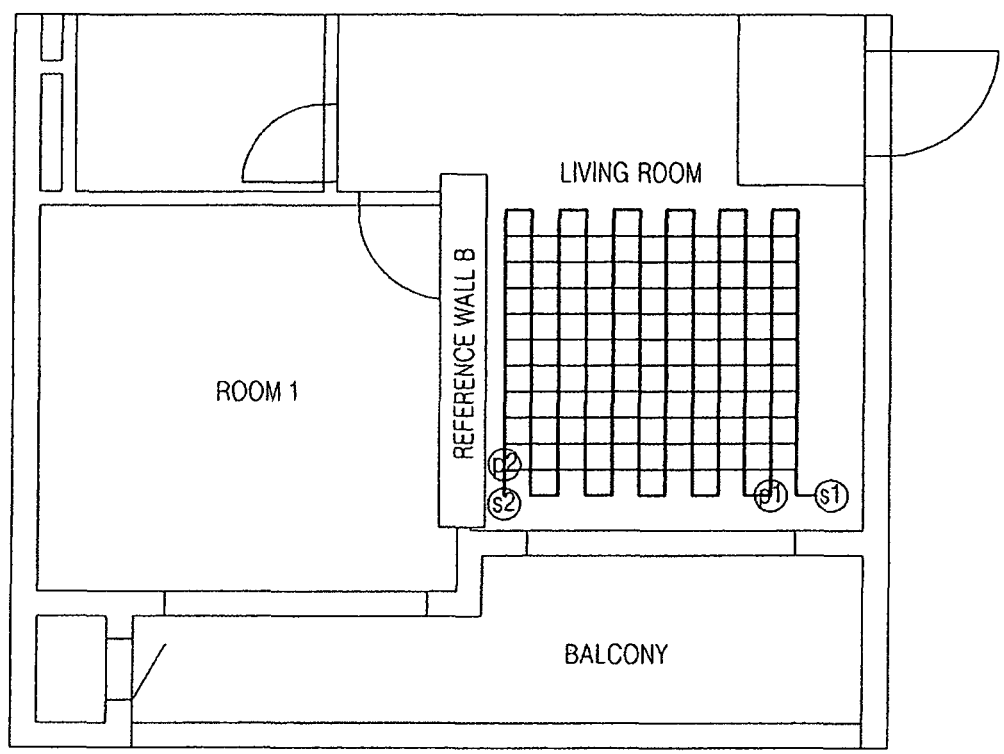

If it is determined in operation 190 that the angle of the reference wall A has been changed by the specific angle or more, the controller 18 determines that the robot cleaner has traveled throughout the given cleaning region and rotates to the right (or left) by 180 degrees with respect to the reference wall A and selects a wall at the left side of the robot cleaner, for example, at a start position s2 of the robot cleaner in the cleaning region (for example, a living room) as a reference wall B based on the left-based travel algorithm as shown in FIG. 5B (200).

When the reference wall B is selected, the controller 18 performs a wall-following movement of the specific interval d along the reference wall B (210) and then rotates to the right (or left) to be at 90 degrees to the reference wall B (220) and then moves straight a predetermined distance L (230).

After moving straight the predetermined distance L, the robot cleaner rotates to the left by 90 degrees (240) and moves straight the predetermined distance d (250). The robot cleaner again rotates to the left by 90 degrees (260) and moves straight to a position p2 to return to the reference wall B (270).

After moving straight to the position p2, the robot cleaner again rotates to the right by 90 degrees to perform a wall-following movement (280). In this manner, the robot cleaner moves in a zigzag travel pattern to gradually cover the cleaning region as shown in FIG. 5B. The controller 18 then determines whether or not the cleaning has been completed with reference to the shape of the contour created in FIG. 4 according to the wall-following technique (290). If the cleaning has not been completed, the controller 18 returns to the above operation 210 to start a wall-following movement of the specific interval d along the reference wall B.

Accordingly, the robot cleaner gradually covers the cleaning region (for example, a living room) in two zigzag travel patterns in which the robot cleaner moves the predetermined distance L at specific intervals d along the reference walls A and B in the same cleaning region, respectively. As shown in FIG. 5B, the two zigzag travel patterns are perpendicular to each other to form a matrix of paths so that the robot cleaner can travel the entire cleaning region without skipping any part of the cleaning region.

Figure 5C:
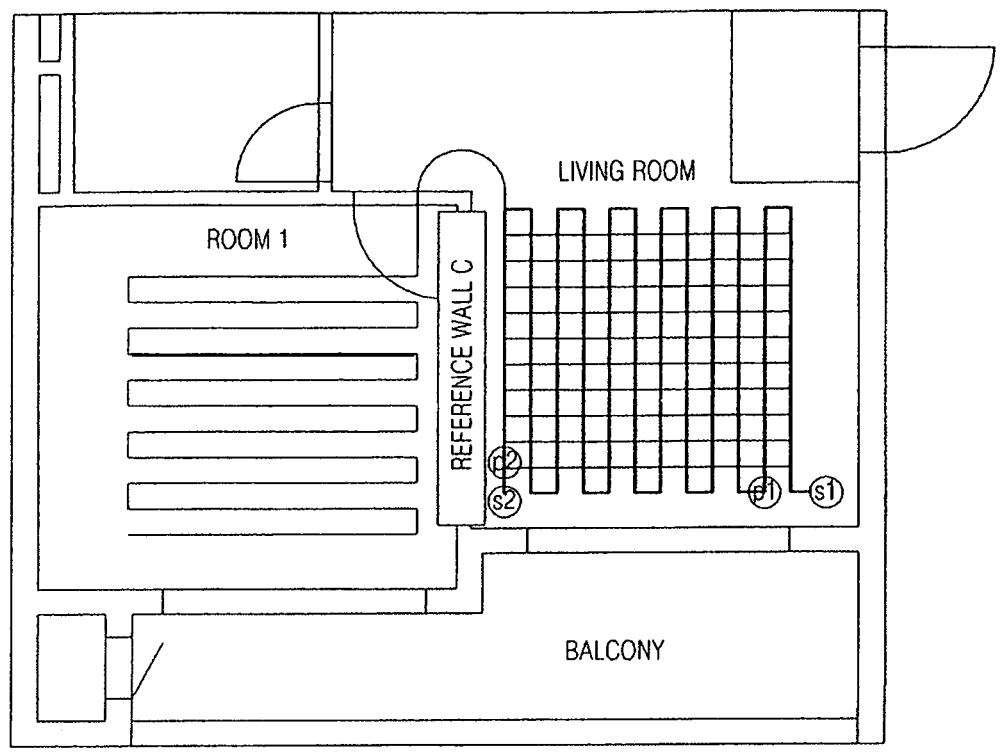

Upon completion of cleaning of the given cleaning region, the robot cleaner moves to a next cleaning region (for example, room 1) as shown in FIG. 5C (300), returns to the above operation 100 and repeats the subsequent operations to clean the next cleaning region.

Figure 5D:
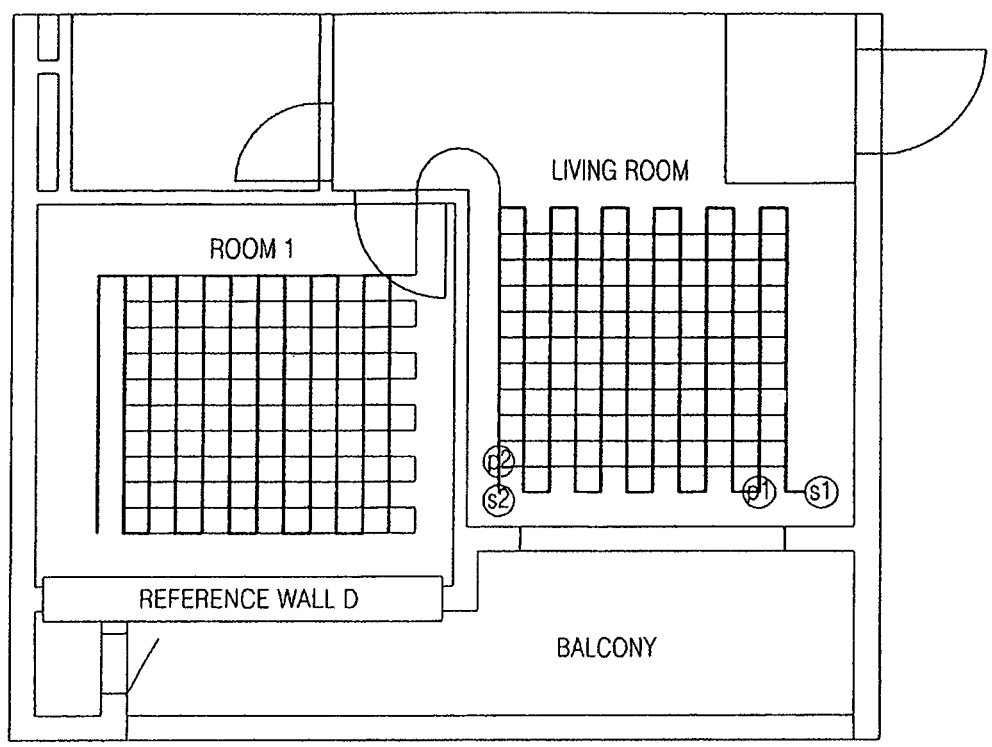

For the next cleaning region (for example, room 1), the controller 18 also selects a reference wall C and a reference wall D based on the left-based travel algorithm as shown in FIGS. 5C and 5D and repeats the operations subsequent to operation 100. Accordingly, the robot cleaner gradually covers the cleaning region (for example, room 1) in two zigzag travel patterns in which the robot cleaner moves the predetermined distance L at specific intervals d along the reference walls C and D in the same cleaning region, respectively. As shown in FIG. 5D, the two zigzag travel patterns are perpendicular to each other to form a matrix of paths so that the robot cleaner can travel the entire cleaning region without skipping any part of the cleaning region.

Although the wall-following travel algorithm of FIGS. 3A and 3B has been described for the case where no obstacle is present, how the robot cleaner avoids an obstacle when encountering the obstacle while moving straight the predetermined distance L will now be described with reference to FIGS. 6 and 7.

Figure 6:
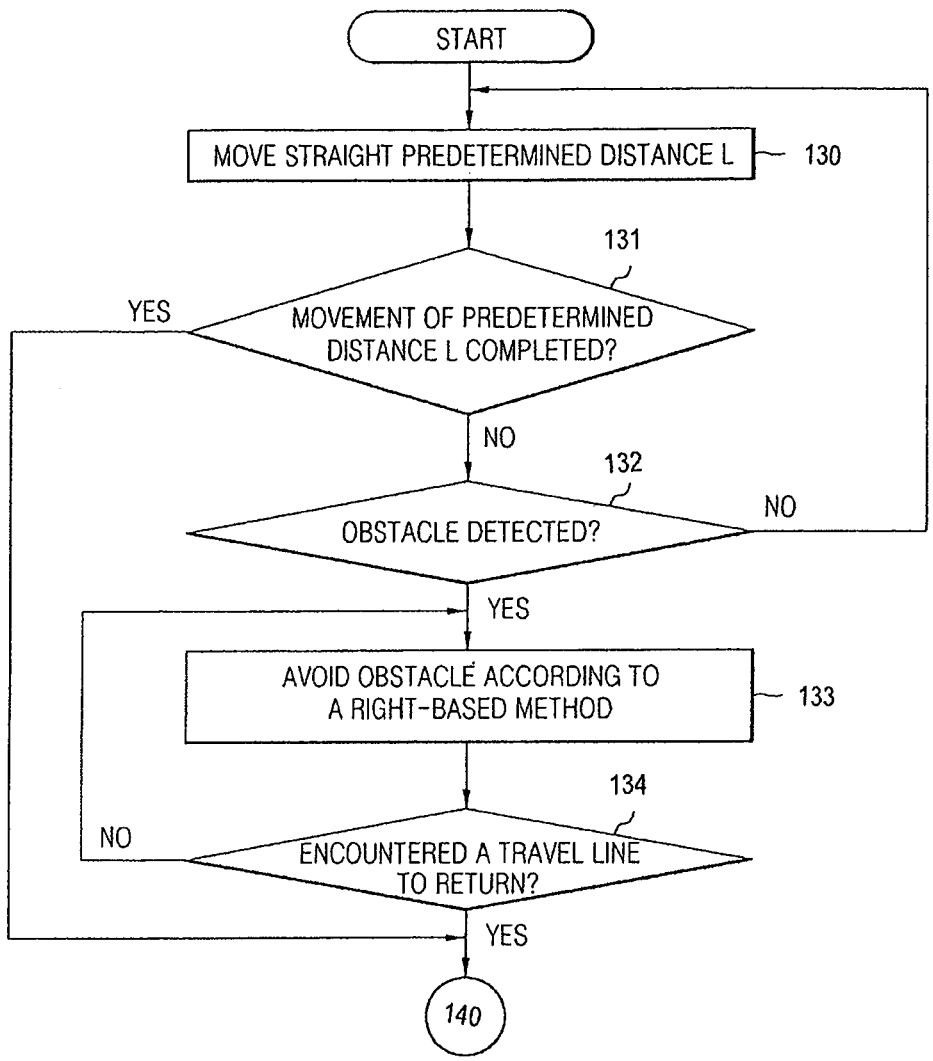
FIG. 6 is a flow chart showing how a robot cleaner according to the present embodiment operates to avoid an obstacle while traveling a cleaning region.

FIG. 6 is a flow chart showing how a robot cleaner according to the present embodiment operates to avoid an obstacle while traveling a cleaning region.

As shown in FIG. 6, the robot cleaner moves straight a predetermined distance L after rotating to be at 90 degrees to a reference wall A or B (130). While the robot cleaner moves straight the predetermined distance L, the controller 18 determines whether or not the robot cleaner has completed the movement of the predetermined distance L (131). If the movement of the predetermined distance L has been completed, the controller 18 proceeds to operation 140 to perform the subsequent operations.

If it is determined in operation 131 that the cleaning of the predetermined distance L has not been completed, the controller 18 determines whether or not any obstacle has been detected at a position ahead of the robot cleaner through the obstacle detector 12 while the robot cleaner moves straight the predetermined distance L (132). If an obstacle has been detected, the robot cleaner rotates to avoid the obstacle according to a right-based method in which the robot cleaner rotates to avoid the obstacle while keeping the obstacle at the right side of the robot cleaner (133). If an obstacle has not been detected, the robot cleaner again continues to move straight the predetermined distance (130).

The algorithm predetermines, by software, the distance to an obstacle at which the robot cleaner avoids the obstacle within a range of distances measurable by the obstacle detector 12. The distance to the obstacle is kept constant through a feedback control method, which controls the wheel speed based on the distance measured by the obstacle detector 12.

Figure 8:
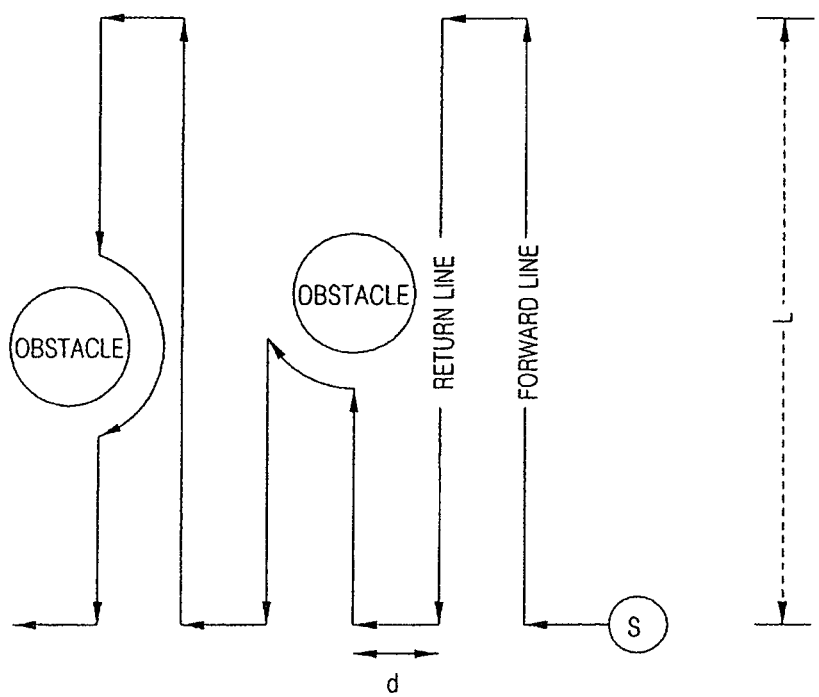
FIG. 8 shows an example of how a robot cleaner according to the present embodiment avoids an obstacle.

According to an increase or decrease in the output of each of the encoders attached to both wheels, the controller 18 determines whether or not the robot cleaner has encountered a travel line to return after rotation (a forward or return line in FIG. 8) (134). The controller 18 returns to the above operation 133 if the robot cleaner has not encountered the travel line to return and proceeds to operation 140 to perform the subsequent operations if the robot cleaner has encountered the travel line to return.

Figure 7:
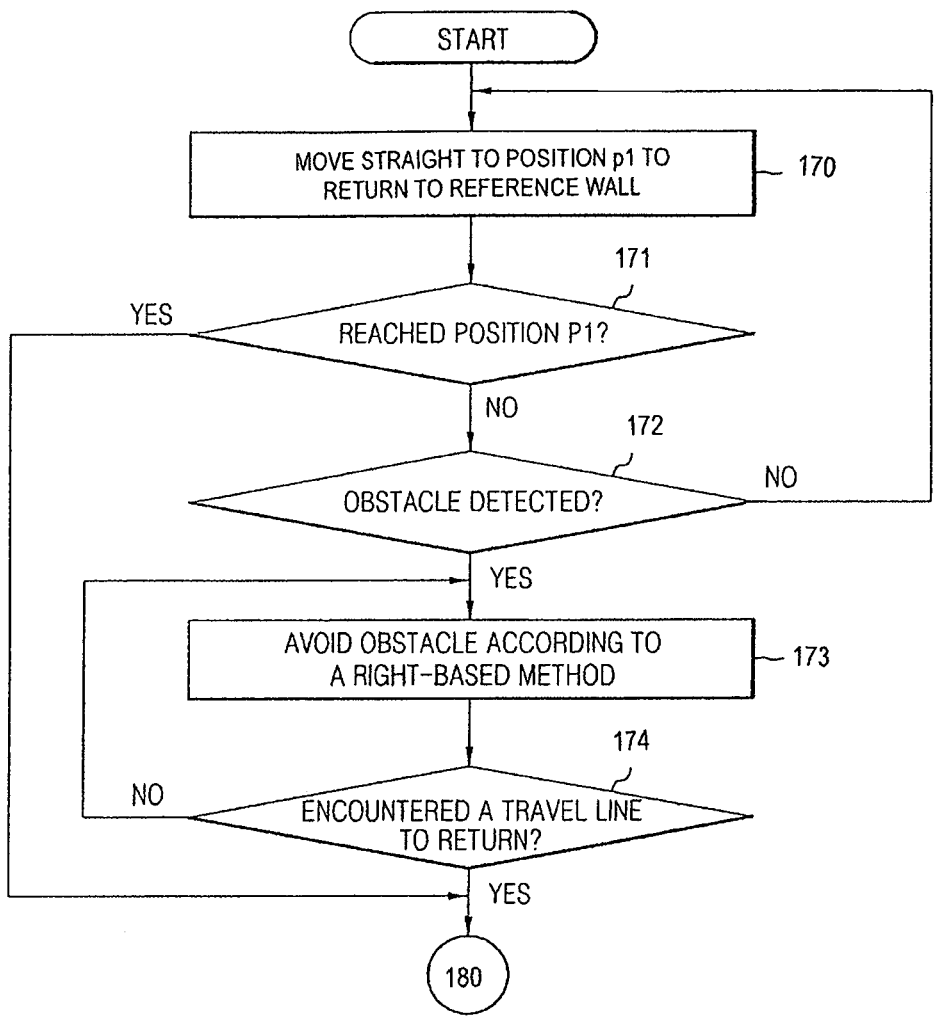
FIG. 7 is a flow chart showing how a robot cleaner according to the present embodiment operates to avoid an obstacle while traveling a cleaning region and returning to a reference wall.

FIG. 7 is a flow chart showing how a robot cleaner according to the present embodiment operates to avoid an obstacle while traveling a cleaning region and returning to a reference wall.

As shown in FIG. 7, the robot cleaner moves straight to a position p1 to return to the reference wall (170). While the robot cleaner moves straight to the position p1, the controller 18 determines whether or not the robot cleaner has reached the position p1 (171). When the robot cleaner has reached the position p1, the controller 18 proceeds to the above operation 180 and performs operation 180 and the subsequent operations.

If it is determined in operation 171 that the robot cleaner has not reached the position p1, the controller 18 determines whether or not any obstacle has been detected at a position ahead of the robot cleaner through the obstacle detector 12 while the robot cleaner moves straight to the position p1 (172). If an obstacle has been detected, the robot cleaner rotates to avoid the obstacle according to a right-based method in which the robot cleaner rotates to avoid the obstacle while keeping it at the right side of the robot cleaner (173). If an obstacle has not been detected, the controller 18 returns to operation 170 and continues moving the robot cleaner straight to position p1 to return to the reference wall.

According to an increase or decrease in the output of each of the encoders attached to both wheels, the controller 18 determines whether or not the robot cleaner has encountered a travel line to return after rotation (a forward or return line in FIG. 8) (174). The controller 18 returns to the above operation 173 if the robot cleaner has not encountered the travel line to return and proceeds to operation 180 to perform the subsequent operations if the robot cleaner has encountered the travel line to return.

As is apparent from the above description, the present embodiment provides a robot cleaner and a method to control the same with a variety of features and advantages. For example, the robot cleaner can more efficiently clean an entire region to be cleaned (an entire cleaning region) without skipping any part of the cleaning region using a wall-following algorithm which allows the robot cleaner to travel along the outline of the cleaning region.

In addition, a left or right-based travel algorithm which allows the robot cleaner to travel along a left or right wall is applied so that the robot cleaner can uniformly clean the entire cleaning region while moving in a zigzag travel pattern in which a wall at the left or right side of the robot cleaner at a start position is used as a reference wall. In addition, two or more reference walls of the cleaning region are selected such that the corresponding zigzag travel patterns of the robot cleaner are perpendicular to each other to form a matrix of paths, thereby allowing the robot cleaner to travel the entire cleaning region without skipping any part of the cleaning region. This prevents skipping of cleaning of any part of the cleaning region and minimizes overlapping of cleaned areas, thereby more efficiently cleaning the given cleaning region.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A method to control a robot cleaner having a controller therein, the method comprising:
    selecting a first reference wall at a start position of the robot cleaner;
    controlling the robot cleaner to move in a zigzag travel pattern with respect to the selected first reference wall, the zigzag travel pattern being a pattern in which the robot cleaner repeatedly moves, beginning from the start position, first by a first predetermined distance along the first selected reference wall, moves second by a second predetermined distance in a direction perpendicular to the first selected reference wall, moves third by the first predetermined distance in a direction parallel to the first selected reference wall, and moves fourth by the second predetermined distance to return to the first selected reference wall;
    determining whether the robot cleaner has completed cleaning of the cleaning region, the robot cleaner moving in the zigzag travel pattern to gradually cover the cleaning region while following the selected first reference wall;
    selecting a second reference wall at a position at which the robot cleaner has completed the cleaning when the robot cleaner is determined to have completed the cleaning of the cleaning region; and
    controlling the robot cleaner to move along paths in a matrix including at least two zigzag travel patterns in directions perpendicular to each other to allow the robot cleaner to travel throughout the cleaning region.

2. The method according to claim 1, wherein selecting the first reference wall includes selecting a wall at a left side of the robot cleaner at the start position based on a left-based travel algorithm that allows the robot cleaner to travel along the wall at the left side of the robot cleaner, the left-based travel algorithm being stored on a computer readable medium and executed by the controller.

3. The method according to claim 1, wherein selecting the first reference wall includes selecting a wall at a right side of the robot cleaner at the start position based on a right-based travel algorithm that allows the robot cleaner to travel along the wall at the right side of the robot cleaner, the right-based travel algorithm being stored on a computer readable medium and executed by the controller.

4. The method according to claim 1, wherein a number of the selected reference walls is at least two.

5. The method according to claim 4, wherein controlling the robot cleaner to travel the cleaning region includes controlling the robot cleaner to move in a zigzag travel pattern to gradually cover the cleaning region, the zigzag travel pattern being a pattern in which the robot cleaner repeatedly moves by the first predetermined distance along the second selected reference wall, moves by the second predetermined distance in a direction perpendicular to the second selected reference wall, moves by the first predetermined distance in a direction parallel to the second selected reference wall, and moves by the second predetermined distance to return to the second selected reference wall.

6. A robot cleaner to travel a given cleaning region to clean the cleaning region, the robot cleaner comprising:
    a movable robot body; and
    a controller to select a first reference wall at a start position of the robot cleaner and to drive the movable robot body of the robot cleaner to allow the robot cleaner to move in a zigzag travel pattern, the zigzag travel pattern being a pattern in which the robot cleaner repeatedly moves, beginning from the start position, first by a first predetermined distance along the first selected reference wall, moves second by a second predetermined distance in a direction perpendicular to the first selected reference wall, moves third by the first predetermined distance in a direction parallel to the first selected reference wall, and moves fourth by the second predetermined distance to return to the first selected reference wall,
    wherein the controller determines whether the robot cleaner has completed cleaning of the cleaning region, the robot cleaner moving in the zigzag travel pattern to gradually cover the cleaning region while following the selected first reference wall, and selects a second reference wall at a position at which the robot cleaner has completed the cleaning when the controller determines that the robot cleaner has completed the cleaning of the cleaning region,
    wherein the controller controls the robot cleaner to move along paths in a matrix including at least two zigzag travel patterns in directions perpendicular to each other to allow the robot cleaner to travel throughout the cleaning region.

7. The robot cleaner according to claim 6, wherein the controller selects a wall at a left side of the robot cleaner at the start position based on a left-based travel algorithm that allows the robot cleaner to travel along the wall at the left side of the robot cleaner, the left-based travel algorithm being stored on a computer readable medium and executed by the controller.

8. The robot cleaner according to claim 6, wherein the controller selects a wall at a right side of the robot cleaner at the start position based on a right-based travel algorithm that allows the robot cleaner to travel along the wall at the right side of the robot cleaner, the right-based travel algorithm being stored on a computer readable medium and executed by the controller.

9. The robot cleaner according to claim 6, wherein the controller selects at least two reference walls.

10. The robot cleaner according to claim 6, wherein the controller controls the robot cleaner to move in a zigzag travel pattern to gradually cover the cleaning region, the zigzag travel pattern being a pattern in which the robot cleaner repeatedly moves by the first predetermined distance along the second selected reference wall, moves by the second predetermined distance in a direction perpendicular to the second selected reference wall, moves by the first predetermined distance in a direction parallel to the second selected reference wall, and moves by the second predetermined distance to return to the second selected reference wall.

11. A method of controlling a robot cleaner having a controller therein, comprising:
- selecting a first reference wall of a room in relation to the robot cleaner;
- controlling the robot cleaner to move in a zigzag travel pattern with respect to the selected first reference wall, the zigzag travel pattern being a pattern in which the robot cleaner repeatedly moves first by a first predetermined distance along the first selected reference wall, moves second by a second predetermined distance in a direction perpendicular to the first selected reference wall, moves third by the first predetermined distance in a direction parallel to the first selected reference wall, and moves fourth by the second predetermined distance to return to the first selected reference wall;
- determining whether the robot cleaner has completed cleaning of the cleaning region, the robot cleaner moving in the zigzag travel pattern to gradually cover the cleaning region while following the selected first reference wall;
- selecting a second reference wall at a position at which the robot cleaner has completed the cleaning when the robot cleaner is determined to have completed the cleaning of the cleaning region; and
- controlling the robot cleaner to move along paths in a matrix including at least two zigzag travel patterns in directions perpendicular to each other to allow the robot cleaner to travel throughout the cleaning region.

12. The method according to claim 11, further comprising determining whether an angle of the first selected reference wall has changed by more than a specific angle with reference to a contour of the room,
- wherein the robot cleaner is controlled to move the first predetermined distance, rotate 90 degrees and move the second predetermined distance in repetition when it is determined that the angle of the first selected reference wall has not changed by more than the specific angle with reference to the contour of the room.

13. The method according to claim 11, further comprising:
- selecting a second reference wall of the room in relation to the robot cleaner; and
- controlling the robot cleaner to move the first predetermined distance, rotate 90 degrees and move the second predetermined distance in repetition in relation to the second selected reference wall when it is determined that the angle of the first selected reference wall has changed by more than the specific angle with reference to the contour of the room.

* * * * *

UNITED STATES PATENT AND TRADEMARK OFFICE
CERTIFICATE OF CORRECTION

PATENT NO.         : 8,457,789 B2
APPLICATION NO.    : 12/007898
DATED              : June 4, 2013
INVENTOR(S)        : Jun Pyo Hong et al.

It is certified that error appears in the above-identified patent and that said Letters Patent is hereby corrected as shown below:

In the Specification:

In Col. 1, Line 8 (Approx.), Delete "Apr 9," and insert --Apr 6,--, therefor.

Signed and Sealed this
Eighth Day of October, 2013

Teresa Stanek Rea
*Deputy Director of the United States Patent and Trademark Office*